United States Patent [19]

Matsumoto

[11] Patent Number: 4,672,495
[45] Date of Patent: Jun. 9, 1987

[54] THIN-FILM MAGNETIC HEAD

[75] Inventor: Takashi Matsumoto, Kaisei, Japan

[73] Assignee: Fuji Photo Film Co., Ltd., Japan

[21] Appl. No.: 762,914

[22] Filed: Aug. 5, 1985

[30] Foreign Application Priority Data

Aug. 6, 1984 [JP] Japan .................................. 59-164587

[51] Int. Cl.⁴ ............................ G11B 5/12; G11B 5/22
[52] U.S. Cl. ..................................... 360/125; 360/122
[58] Field of Search ................ 360/119, 120, 122–124, 360/125–127

[56] References Cited

U.S. PATENT DOCUMENTS 4,092,688  5/1978  Nomura et al. ................ 360/123 X
4,357,640 11/1982  Heinz et al. ..................... 360/123 X
4,490,760 12/1984  Kaminaka et al. .................. 360/126

Primary Examiner—John H. Wolff
Attorney, Agent, or Firm—Pasquale A. Razzano

[57] ABSTRACT

A thin-film magnetic head includes a substrate composed of a plurality of blocks, a plurality of lower magnetic layers alternating with the blocks, and an upper magnetic layer disposed as a thin film on the blocks across the lower magnetic layers. Each of the lower magnetic layers has a width defining a track width of the magnetic head and a height larger than the width, and the upper magnetic layer has a length extending in the direction of the track width and larger than a yoke length thereof.

9 Claims, 8 Drawing Figures

THIN-FILM MAGNETIC HEAD

BACKGROUND OF THE INVENTION

1. Field of the Invention

The present invention relates to a magnetic head for recording signals on and reproducing signals from a magnetic recording medium such as a magnetic disc or a magnetic tape while slidably moving thereon, and more particularly to a thin-film magnetic head suitable for recording signals on and reproducing signals from a small-size magnetic recording medium.

2. Description of the Prior Art

There have heretofore been developed various magnetic recording and reproducing apparatuses for recording various signals on and reproducing various signals from magnetic recording mediums. In recent years, with the miniaturization of magnetic recording mediums, efforts have also been made to develop magnetic heads suitable for recording information signals on and reproducing recorded information signals from a variety of such magnetic recording mediums. For example, there is known a small-size disc-shaped magnetic recording medium in which the innermost circular recording track has a radius of 15 mm and the outermost circular recording track has a radius of 20 mm. The magnetic heads for recording signals on and reproducing signals from such small-size disc-shaped magnetic recording mediums are required to be smaller in size and to suffer reduced crosstalk. To meet these requirements, thin-film magnetic heads are used more and more frequently in place of conventional bulk-type magnetic heads. The thin-film magnetic heads can be fabricated in miniature size for multichannel recording and reproducing capability and lowered crosstalk. The thin-film magnetic heads are especially finding use as narrow-track magnetic heads for recording signals in a high track density.

As shown in FIG. 5 of the accompanying drawings, one known thin-film magnetic head is composed of upper and lower magnetic layers 2, 4 deposited as thin films on a substrate 1, the upper and lower magnetic layers 2, 4 serving as magnetic poles. For the prior thin-film magnetic head to have a very small track width, the upper and lower magnetic layers 2, 4 have to be shaped to make their track widths smaller than the yoke length. In the magnetic layer in which the yoke length is larger than the track width, however, spontaneous magnetization in the magnetic layer tends to be oriented in a direction parallel to the yoke length due to geometric anisotropy. Therefore, when responding to the magnetic fluxes generated by signals recorded on the magnetic recording medium in a playback mode, or the external magnetic fluxes produced by currents flowing in a recording mode, the magnetic layer is magnetized by movement of the magnetic wall, resulting in a low speed of response in the recording and playback modes. As a consequence, the conventional thin-film magnetic head has a reduced magnetic efficiency and a lowered signal-to-noise ratio in the high-frequency range, and suffers higher Barkhausen noise in signal reproduction. Another problem is that since the upper magnetic layer has a small cross-sectional area, the magnetic head is magnetically saturated in the vicinity of the gap when recording signals on the magnetic recording medium, with a resulting reduced recording efficiency.

In the conventional thin-film magnetic head design, the magnetic layers are deposited on the substrate employed as a lamination support. When the magnetic head slides against the magnetic recording medium, the substrate sometimes damages the magnetic recording medium, causing an error in reading signals therefrom.

SUMMARY OF THE INVENTION

In view of the shortcomings of the prior thin-film magnetic head, it is an object of the present invention to provide a high-performance thin-film magnetic head which has a narrow track width suitable for recording signals on and reproducing signals from a magnetic recording medium having a high track density, has good characteristics in the high-frequency range and a good signal-to-noise ratio, does not produce high Barkhausen noise, is not magnetically saturated at the gap in recording signals on the magnetic recording medium, and is capable of reading signals highly reliably from the magnetic recording medium without damaging it with the substrate.

According to the present invention, there is provided a thin-film magnetic head including a substrate composed of a plurality of self-lubricating blocks, a plurality of lower magnetic layers of a highly magnetically permeable material alternating with the blocks, each of the lower magnetic layers having a width defining a track width of the magnetic head and a height larger than the width, and an upper magnetic layer of a highly magnetically permeable material disposed as a thin film on the blocks across the lower magnetic layers, the upper magnetic layer having a length extending in the direction of the track width and larger than a yoke length thereof. Due to geometric anisotropy, the upper magnetic layer has a more easily magnetizable axis extending in the direction of the track width. Since the width of each lower magnetic layer defines the track width, the track width can be small for recording signals on and reproducing signals from a magnetic recording medium having a high track density. With the length of the upper magnetic layer in the direction of the track width being larger than the yoke length, the upper magnetic layer has a more easily magnetizable axis extending along the yoke length. Therefore, when an external magnetic field is applied in the direction of the yoke length for recording or reproducing signals, the upper magnetic layer is magnetized by revolving magnetization. Inasmuch as the revolving magnetization has a higher speed of response than possible with magnetization due to movement of the magnetic wall, the thin-film magnetic head is of high performance in that it has good characteristics in the high frequency range and a good signal-to-noise ratio and does not produce Barkhausen noise. Where the length of each of the lower magnetic layers along the yoke length is smaller than the height thereof, the thin-film magnetic head of the invention has better characteristics for an increased signal recording ability and improved frequency characteristics of a reproduced output. The substrate blocks are made of a self-lubicating material for preventing the substrate from damaging the magnetic recording medium when the magnetic head slides thereon. Consequently, signals can be read from the magnetic recording head by the magnetic head without errors which would otherwise result from damage to the magnetic recording medium. As a result, signals can reliably be recorded on and reproduced from the thin-film magnetic head of the present invention.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
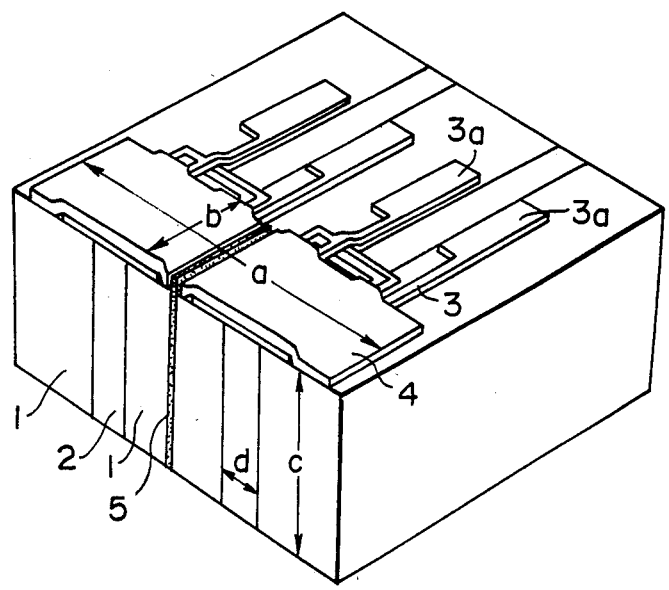
FIG. 1 is a perspective view of a thin-film magnetic head according to the present invention.

FIG. 1 shows a two-channel thin-film magnetic head according to the present invention. The thin-film magnetic head includes a laminated body comprising a nonmagnetic substrate 1 composed of a plurality (three in the illustrated embodiment) of blocks each made of a self-lubricating material, and a plurality (two in the illustrated embodiment) of lower magnetic layers 2 each having a prescribed width. The substrate blocks and the lower magnetic layers 2 alternate with each other, each of the lower magnetic layers 2 being sandwiched between two of the substrate blocks.

The self-lubricating material of the substrate blocks has a coefficient of friction of 0.2 or less, and may be glass-like carbon (for example, Kao glass-like carbon - R type manufactured by Kao Soap Co., Ltd. or Strux manufactured by Fudow Chemical Co., Ltd.).

Figure 2A:
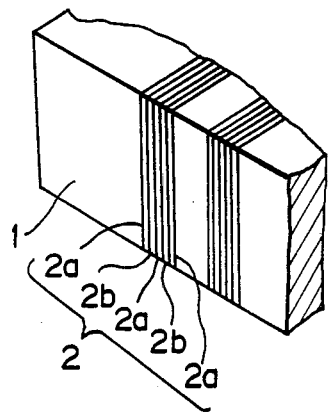
FIG. 2(a) is a fragmentary perspective view of lower magnetic layers.

FIG. 2(a) shows one form of the lower magnetic layers 2. Each of the lower magnetic layers 2 is composed of a plurality of metallic magnetic layers 2a made as of permalloy, Sendust, or an amorphous alloy, and a plurality of insulating layers 2b made as of silicon dioxide or a resin with silicon dioxide dispersed therein, the layers 2a, 2b alternating with each other. The lower magnetic layers 2 may be sandwiched between the substrate blocks as by evaporation, sputtering, or plating, or may be in the form of thin bulk films bonded or otherwise attached to the substrate blocks.

Figure 2B:
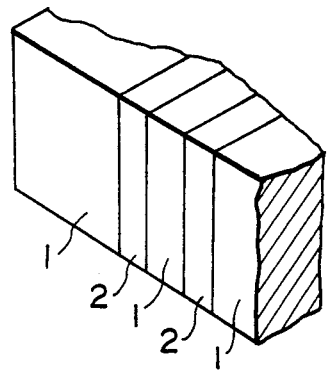
FIG. 2(b) is a fragmentary perspective view of modified lower magnetic layers.

FIG. 2(b) illustrates a modification in which each of the lower magnetic layers 2 is a single layer made of a magnetic oxide such as ferrite or a metallic magnetic material. Each of the single magnetic layers 2 may be bonded or otherwise attached to the substrate blocks.

As shown in FIG. 1, each of the lower magnetic layers 2 has a width d selected to define a narrow track width suitable for recording signals on and reproducing signals from a magnetic recording medium having a high track density, the width d being smaller than the height c of the lower magnetic layer 2.

The laminated body of the thin-film magnetic head has a smoothly finished upper surface on which there are deposited spiral coils 3 each disposed on the upper surface of one of the lower magnetic layers 2. Each of the spiral coils 3 has a pair of terminals 3a, 3a extending rearwardly parallel to each other for connection to an external circuit (not shown). An upper magnetic layer 4 is deposited as a thin film on the upper surface of the laminated body, the upper magnetic layer 4 being made of a magnetic material having a high magnetic permeability, such as permalloy, Sendust, or an amorphous alloy. The upper magnetic layer 4 has a width b selected to cover the turns of the coils 3, leaving the terminals 3a, 3a exposed on the upper surface of the laminated body. The upper magnetic layer 4 has a length a in the direction across the track width, the length a being larger than the yoke length thereof which is equivalent to the width b. The thin-film magnetic head also includes a shield layer 5 extending centrally through the central substrate block between and parallel to the lower magnetic layers 2, the shield layer 5 having an upper end projecting through the upper magnetic layer 4 to divide the same into halves.

In the thin-film magnetic head of the above construction, the track width is defined by the width d of each lower magnetic layer 2 which is equal to the thickness thereof as sandwiched between the substrate blocks. Therefore, the track width can be selected to be small irrespectively of whether the lower magnetic layer 2 is composed of a plurality of thin films or a bulk body. The length a of the upper magnetic layer 4 is larger than the yoke length b. Due to geometric anisotropy, therefore, the upper magnetic layer 4 has a more easily magnetizable axis extending parallel to the direction of the track width and a less easily magnetizable axis extending perpendicularly to the direction of the track width. When an external magnetic field is applied along the less easily magnetizable axis (i.e., in the direction of the yoke length), the upper magnetic layer 4 is magnetized mainly by revolving magnetization, resulting in an increased speed of response in recording and reproducing signals.

In the illustrated embodiment, the length of each lower magnetic layer 2 parallel to the yoke length is larger than the height c of the lower magnetic layer 2. However, the length of each lower magnetic layer 2c may be smaller than the height c thereof, as shown in FIG. 4, so that the lower magnetic layer 2c may have a more easily magnetizable axis extending parallel to the length thereof due to geometric anisotropy. Since this more easily magnetizable axis is normal to the direction in which the external magnetic field is applied along the yoke length, the lower magnetic layer is also magnetized by revolving magnetization for a higher response speed in recording and reproducing signals. The substrate 1 of the thin-film magnetic head of the present invention is made of a material having a self-lubricating capability. Accordingly, the substrate 1 is less liable to damage the magnetic recording medium with which the magnetic head is held in sliding contact The thin-film magnetic head thus constructed can be manufactured as shown in FIGS. 3(a) through 3(c).

Figure 3A:
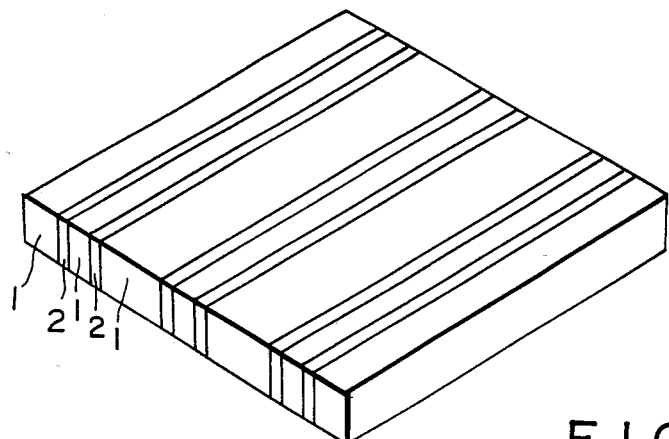
FIGS. 3(a), 3(b), and 3(c) are perspective views showing successive steps in the process of fabricating the thin-film magnetic head according to the present invention.
Figure 3B:
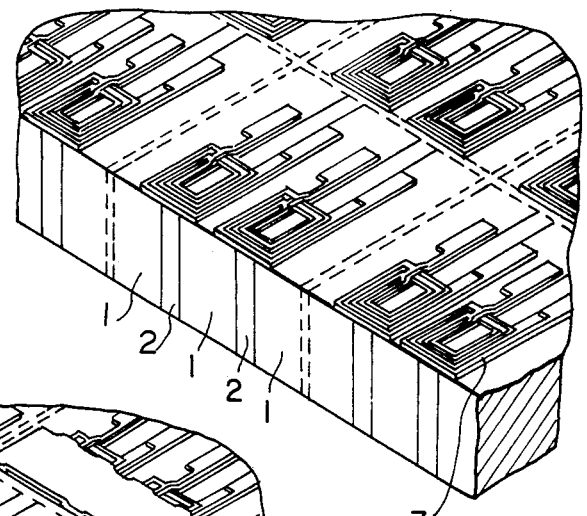
Figure 3C:
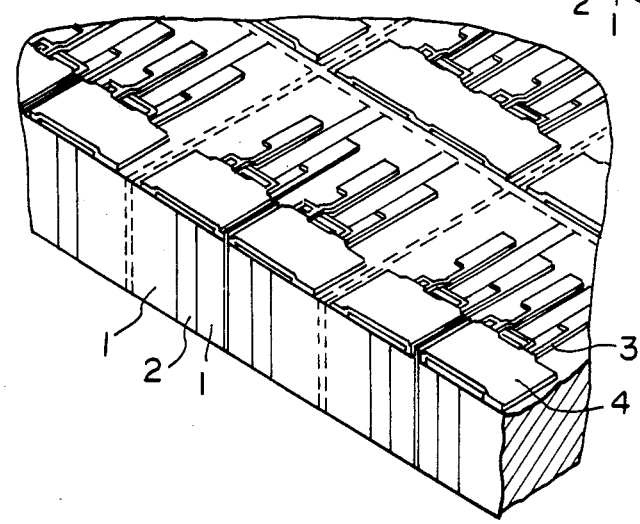
Figure 4:
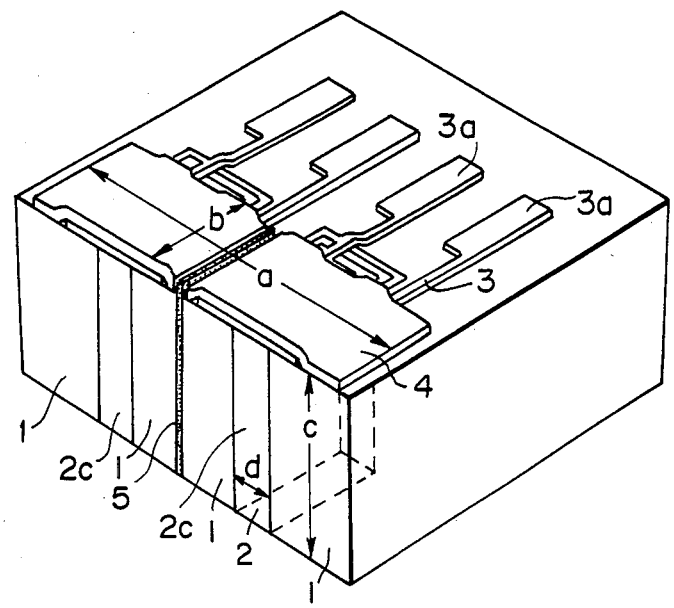
FIG. 4 is a fragmentary perspective view of a magnetic head according to another embodiment of the present invention.
Figure 5:
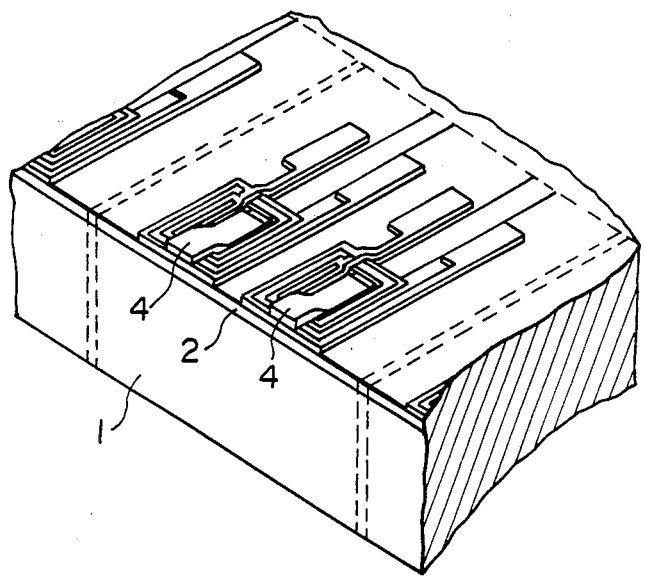
FIG. 5 is a fragmentary perspective view of a conventional thin-film magnetic head.

The blocks of the substrate 1 and the lower magnetic layers 2 are alternately arranged to produce a laminated body as shown in FIG. 3(a). Then, the coils 3 are deposited respectively on the exposed upper surfaces of the lower magnetic layers 2 as illustrated in FIG. 3(b). Thereafter, the upper magnetic layers 4 are deposited on and across each pair of the coils 3 as shown in FIG. 3(c). The laminated body composed of the substrate 1 and the lower magnetic layers 2 is cut off along the broken lines (FIGS. 3(b) and 3(c)) to produce a number of thin-film magnetic heads efficiently.

While the illustrated thin-film magnetic head is in the form of a two-channel magnetic head, the present invention is also applicable to a magnetic head having one or more than three channels.

Although certain preferred embodiments have been shown and described, it should be understood that many changes and modifications may be made therein without departing from the scope of the appended claims.

I claim:

1. A thin-film magnetic head for recording signals on and reproducing signals from a magnetic recording medium comprising:
   (i) a substrate composed of a plurality of blocks;
   (ii) a plurality of lower magnetic layers of a highly magnetically permeable material, each said lower magnetic layers being positioned between two of the substrate blocks, each of said lowr magnetic layers having a width defining a track width of the magnetic head and a height larger than said width; and
   (iii) an upper magnetic layer of a highly magnetically permeable material disposed as a thin film on said blocks across said lower magnetic layers, said upper magnetic layer having a length extending in the direction of the track width and larger than a yoke length thereof.

2. A thin-film magnetic head according to claim 1, wherein each of said blocks is made of a self-lubricating material.

3. A thin-film magnetic head according to claim 1, wherein said self-lubricating material is glass-like carbon.

4. A thin-film magnetic head according to claim 1, wherein each of said lower magnetic layers comprises a plurality of metallic magnetic layers and one or a plurality of insulating layers alternating with said metallic magnetic layers.

5. A thin-film magnetic head according to claim 1, wherein each of said lower magnetic layers comprises a single metallic magnetic layer.

6. A thin-film magnetic head according to claim 1, wherein each of said lower magnetic layers comprises a single layer made of a magnetic oxide.

7. A thin-film magnetic head according to claim 1, wherein each of said lower magnetic layers has a length extending in the direction of the yoke length and smaller than the height thereof.

8. A thin-film magnetic head according to claim 1, including a shield layer disposed in the block between said lower magnetic layers.

9. A thin-film magnetic head according to claim 8, wherein said shield layer has an end projecting through said upper magnetic layer to divide the head to separate the channels to avoid interference between channels of the head upon magnetization.

* * * * *